Figure 3:
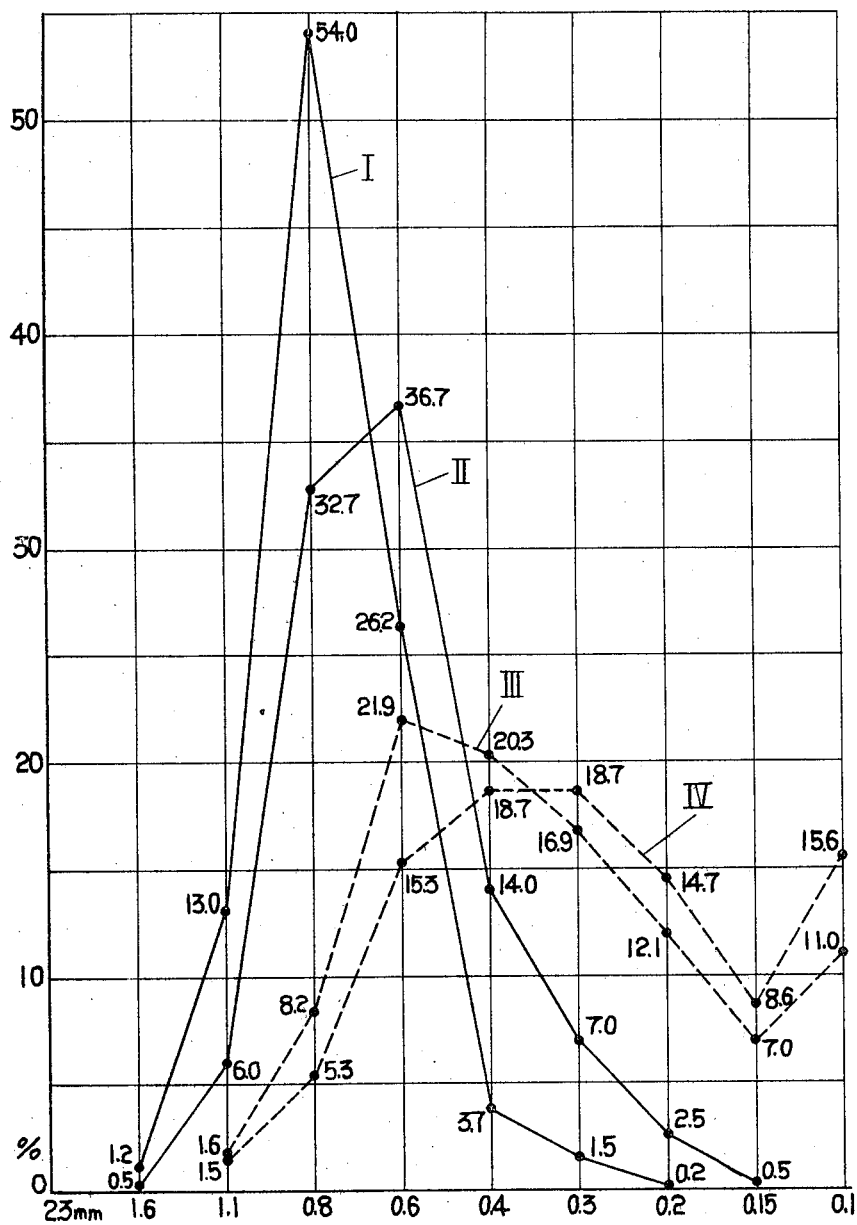

United States Patent [19]

Nojima

[11] 4,333,743

[45] Jun. 8, 1982

[54] SAND-BLASTING ABRASIVE MATERIALS AND METHOD OF PRODUCING THE SAME

[75] Inventor: Nobuo Nojima, Hyogo, Japan

[73] Assignee: Nojimagumi Co., Ltd., Hyogo, Japan

[21] Appl. No.: 845,139

[22] Filed: Oct. 25, 1977

[51] Int. Cl.² .......................... C09G 1/16; B24B 37/00
[52] U.S. Cl. ........................................ 51/298; 51/319; 427/221; 51/295
[58] Field of Search .......................... 51/295, 298, 319; 427/221

[56] References Cited

U.S. PATENT DOCUMENTS

| 1,893,117 | 1/1933 | Webster et al. | 51/298 |
| 2,059,983 | 11/1936 | Dent et al. | 51/298 |
| 2,188,341 | 1/1940 | Elbel et al. | 51/298.1 |
| 2,708,622 | 5/1955 | Stone | 51/298 |
| 2,729,553 | 1/1956 | Price | 51/298 |

*Primary Examiner*—Donald J. Arnold

[57] ABSTRACT

Method of producing sand-blasting abrasive materials, and the materials so produced, consisting of silica sand and/or slag, coated with a thermosetting resin by heat treatment, and the coating being then rendered unsoluble and unmeltable, by subsequent, separate heat treatment. The resin may contain a catalyst.

3 Claims, 4 Drawing Figures

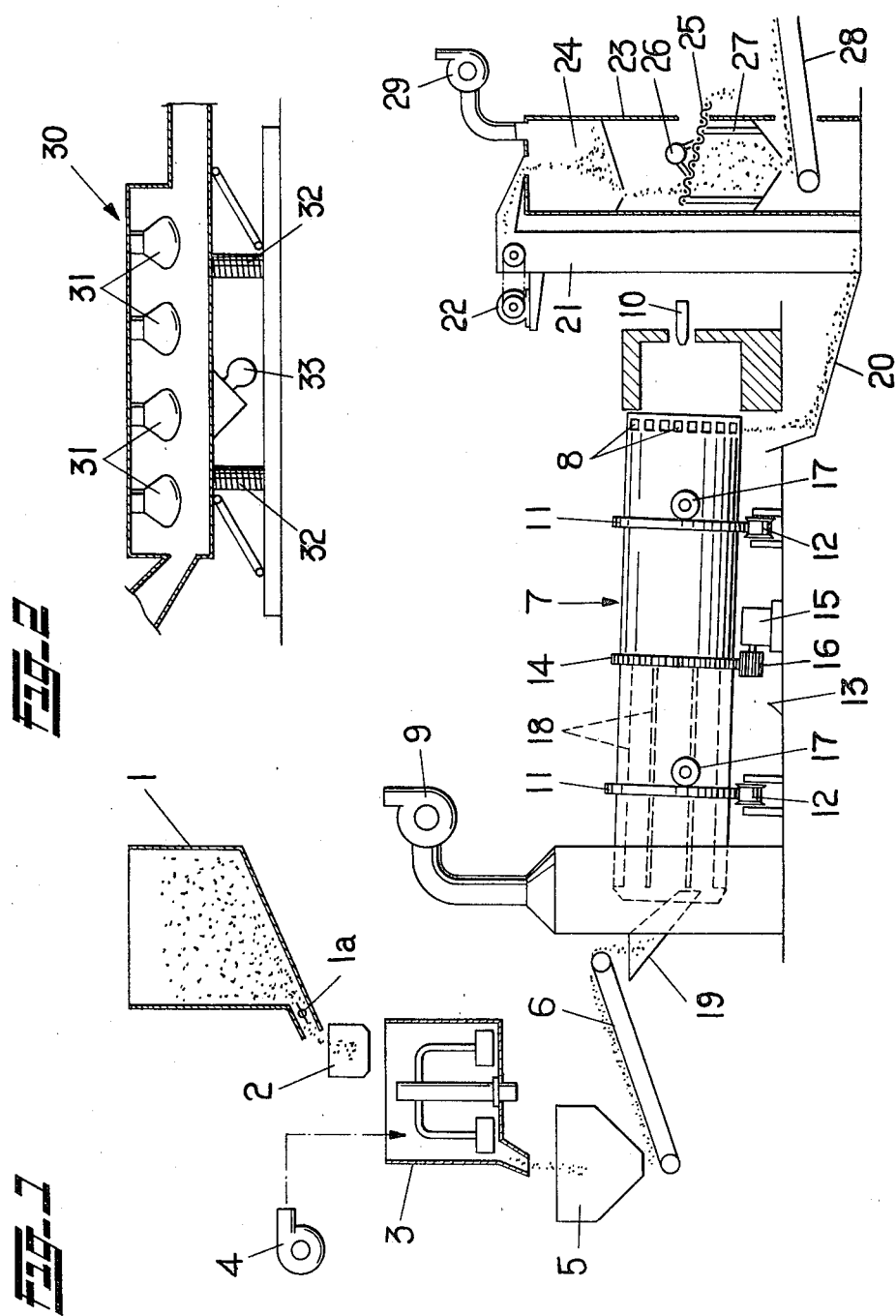

SAND-BLASTING ABRASIVE MATERIALS AND METHOD OF PRODUCING THE SAME

The invention relates to the production of abrasive materials used for sandblasting, and to the abrasive materials themselves.

Abrasive-material blasting machines used in a sandblasting process are designed to propel particles of the abrasive against a surface to be cleaned, the impact produced being effective to remove rust and the like from the surface. Silica sand and slag are chiefly used as abrasive materials; in the following, reference will be made mostly to the "materials", meaning either or both of them. However, silica sand and slag are brittle and generally have many cracks in their surfaces so that upon striking the surface being cleaned they break into fine pieces, producing a large amount of dust. Therefore, the blast-cleaning operation, if carried out in the open, usually greatly influences the nearby environment, such as housing, forming a cause of environmental pollution. There is another serious problem, namely the health of the workers being endangered who inhale the dust.

An object of the present invention is to prevent the occurrence of environmental pollution due to such dust and to contribute to the improvement of environmental working conditions, namely by coating an abrasive material with a thermosetting resin that is rendered unsoluble and unmeltable, whereby the strength of the abrasive material, which may be silica sand or slag, or both, is greatly increased. Thus, particularly in the case of silica sand, which has many cracks, the resin penetrates even to the innermost areas of the cracks, thereby increasing the impact resistance of the silica sand.

According to the invention, the presence of the thermosetting resin coating that is unsoluble and unmeltable increases the efficiency of the sand-blasting operation which uses the abrasive material. More particularly, when the abrasive material is blown against the surface to be cleaned, the material will, of course, be subject to the heat generated by the impact. In this case, in the present invention, the thermosetting resin coating, rendered unsoluble and unmeltable, is not melted on the abrasive material by the heat of impact; rather, it further sets, thereby improving the sand-blasting efficiency.

Figure 4:
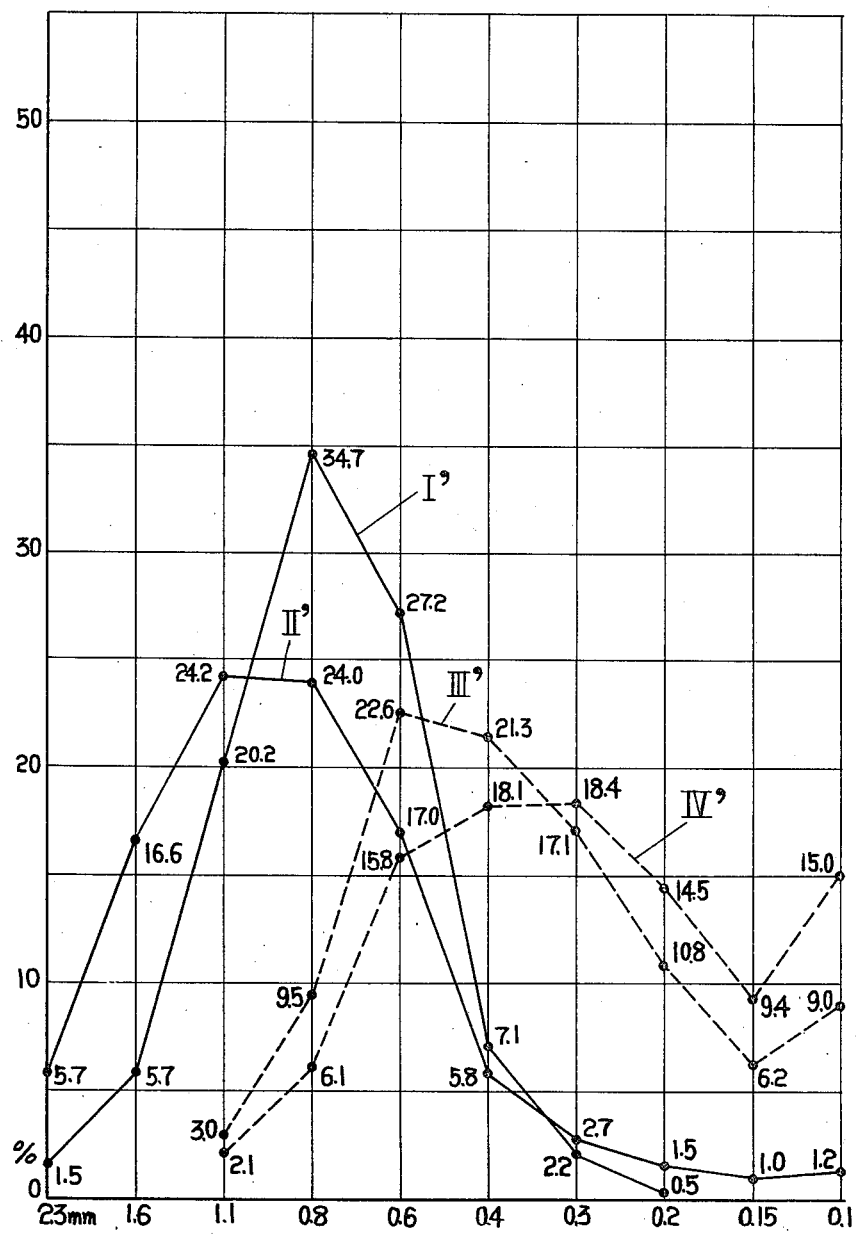

Further objects, important features as well as advantages of the inventive method and product will become better understood by reference to the following detailed description when considered with the accompanying drawings, wherein FIG. 1 is a somewhat schematic view of an apparatus for producing sand-blasting abrasive materials according a first exemplary method of the invention;

FIG. 2 is a similar view of a principal portion of another apparatus for practising the invention; and FIGS. 3 and 4 are particle-size distribution graphs showing comparative-test data between the present invention and the prior art.

Referring to FIG. 1, a material tank 1 containing silica sand or slag (called henceforth "abrasive material" or "material") supplies the sand (or slag) to a measuring tank 2 by opening an outlet damper 1a, which latter is disposed in a lower region of the material tank 1. After a predetermined amount of material is measured by the tank 2, it is dumped into a mixer 3 disposed below the measuring tank.

Also charged into the mixer 3 is an optional setting catalyst used in a fixed proportion to a thermosetting resin to be presently described.

The silica sand and the setting catalyst are uniformly mixed for about one minute, whereupon a thermosetting resin, in a fixed proportion to the silica sand, is charged into the mixer 3. While blowing hot air at 80° to 100° C. from a blower 4 into the mixer 3, they are mixed for about five minutes. As a result, the particles of silica sand obtain a thermosetting resin coating of a fixed thickness, formed on their surfaces, and such a coating is dried and set by the action of heat. The described mixing (adding resin to the sand or slag) and blowing heated air thereinto can be defined as a first phase of the inventive process.

The amounts of the thermosetting resin and the setting catalyst may be suitably changed according to the properties of the materials. As an example, in the case of No. 4 silica sand specified in the Japanese Industrial Standards (JIS), two parts of the thermosetting resin and one part of the catalyst are preferably used with respect to 100 parts of the No. 4 silica sand. As for slag, proportions similar to those described may be used.

By the process described above, the particles of the material (silica sand or slag) are coated with the resin independently, without the particles sticking to each other into a lump or lumps. In this case, since hot air is applied during the mixing, the resin undergoes a chemical change, rendering the same unsoluble and unmeltable, at least to some extent.

When slag is used, however, the resin on the particles of slag becomes viscous like glue, and this condition lasts longer than in the case of silica sand, making it somewhat difficult to achieve the thermal setting thereof. Thus, in order to make the thermal setting complete and also, in the case of silica sand, to cause the resin, which has penetrated even to the innermost areas of cracks peculiar to silica sand, to thermally set completely, the silica sand or slag mixed and resin-coated as explained is heat treated again.

More particularly, the stirred material (reference hereinafter being made primarily to silica sand) is once charged into a hopper 5 and then the silica sand flowing out of the bottom of the hopper is received on a conveyor 6 for transport to a rotary kiln 7. This arrangement for once receiving the sand from the mixer 3 and then transporting it by the conveyor 6 is intended to adjust the rate of supply of the sand to the kiln 7 to suit the capacity of the latter. On the exit side of the kiln 7, outlet ports 8 suitably spaced apart are formed in an outer peripheral surface of the kiln, and hot gas at about 300° C. is blown into the kiln from the exit of the latter, the hot gas travelling toward the entrance of the rotary kiln and being finally expelled into the atmosphere by an exhaust fan 9.

As for the hot gas, air heated by waste gas resulting from combustion of, e.g., kerosene or the like is used and is blown into the rotary kiln 7 by a nozzle 10. As is known in the art, the kiln has annular rails 11 mounted thereon at a plurality of suitable places, and each rail is supported by a pair of rollers 12. In this way, the rotary kiln 7 is rotatably supported on a base 13.

Designated at 14 is a driven gear fixed on an outer peripheral surface of the rotary kiln 7 and meshing with a drive gear 16 secured to a motor 15, whereby the kiln is rotated about its own axis. Designated at 17 are support rollers, each abutting against a lateral surface of the associated annular rail 11. While each support roller 17 is shown located above the associated support roller 12 for simplicity of illustration only, actually it is preferably located between and above the level of the associated support rollers 17. The latter serve to prevent the rotary kiln from inadvertently sliding in the direction of inclination thereof.

The rotary kiln 7 is internally provided with a plurality of stirring vanes 18 extending from the entrance to the middle of the length of the kiln. Accordingly, with the kiln being rotated around its own axis, and with the heated air being blown thereinto, if the silica sand transported by the conveyor 6 is supplied to the kiln through a chute 19, the sand is repeatedly subjected to the action of the stirring vanes 18, scooping it and then dropping it with the rotation of the kiln. During this action the material comes into contact with the hot gas, whereby the thermosetting resin coatings on the particles of silica sand undergo a final thermosetting chemical change, to be rendered unsoluble and unmeltable. The described repeated heating while stirring can be defined as a second, separate phase of the invention.

The silica sand passing by the vanes 18 flows inside the rotary kiln while being shaken or vibrated, until it reaches the exit side of the kiln and finally flows out through the ports 8.

In this connection, it is to be noted that a vibration conveyor 30, shown in FIG. 2, may be used as the heating and stirring mechanism in place of the rotary kiln 7 shown in FIG. 1. More particularly, the vibration conveyor 30, supported by springs 32 and adapted to be vibrated by a suitable mechanism 33, such as an eccentric motor, is associated with infrared-ray radiating devices 31 located thereabove, so that it is heated by the devices 31 while the silica sand supplied to the conveyor 30 from the conveyor 6 through the chute 19 (FIG. 1) is being vibrated and transported by the conveyor 30, so as to render the thermosetting resin coatings unsoluble and unmeltable.

Referring back to FIG. 1, the silica-sand particles which have been discharged from the rotary kiln 7 are collected at the lower end of a bucket lifter 21 by a chute 20. The particles thus collected are then lifted by the bucket lifter 21, operated by a motor 22, and are supplied into a hopper 24 disposed in a sorting tower 23. Inclined below the hopper 24 is a wire screen 25 having the required mesh, and a mechanism 26 is provided for vibrating the screen 25. Designated at 27 are springs for supporting the wire screen 25.

Of the silica-sand particles flowing down the hopper 24 onto the screen 25, only those having particle sizes below a certain limit are allowed to pass through the screen 25 under the action of the vibrations imparted thereto, while the others having sizes above that limit flow down on the wire screen 25 and are discharged to the outside of the system.

Those particles passing through the screen 25 are then transported by a conveyor 28 to a product storage tank. Designated at 29 is an exhaust fan serving to discharge cool air which is being admitted into the sorting tower 23 from below, whereby the silica sand, which was at about 110° C. when leaving the kiln 7 or the conveyor 30, is cooled to about 80° to 50° C. The time required for the sand to pass through the kiln 7 or the conveyor 30 is suitably about one minute and 30 seconds. If the mesh size of the wire screen 25 is changed, the particle size of the silica sand that can be sorted will differ. Thus, it is convenient according to the invention to prepare a plurality of wire screens having different mesh sizes so that they may be selectively used.

The thermosetting resins available for the present invention include phenolic resins, urea resins, melamine resins, polyester resins and alkyd resins. As an example, such a resin is prepared by deriving furfural from pentose, which is extracted from the stalks of cone or kaoliang, adding hydrogen to the furfural to provide furfuryl alcohol, and denaturing the latter with a phenol.

Generally, mention may be made of resins which are commercially available under the name of urea-furfuryl alcohol formaldehyde resins and of phenol furfuryl alcohol formaldehyde resins.

As for the optional setting catalysts, it is desirable to use phosphate-type catalysts such as an aqueous solution of phosphoric acid (75% concentration) or sulfate-type catalysts such as an aqueous solution of sulfuric acid (50% concentration).

The effects of the abrasive materials prepared according to the present invention and used for blast cleaning or sand blasting are shown below by way of examples in comparison with this type of conventional abrasive material.

(1) Results of Comparative Tests for the Amount of Dust

| Abrasive Material Used | Amount of Dust |
| --- | --- |
| No. 4 silica sand (JIS, conventional) | 361 mg/m$^3$ |
| same, but resin-coated according to the invention | 22 mg/m$^3$ |
| Slag (conventional) | 13.2 mg/m$^3$ |
| same, but resin-coated according to the invention | 11.3 mg/m$^3$ |

The above results were obtained by measuring the amount of dust (in mg) per cubic meter at a location 11 meters downstream of the site for tests where the abrasive material was blown against a surface to be cleaned.

(2) Results of Comparative Tests for the Depth of Indentation

| Abrasive Materials Used | Depth of Indentation |
| --- | --- |
| No. 4 silica sand (JIS, conventional) | 95 μ |
| same, but resin-coated according to the invention | 104 μ |
| Slag (conventional) | 100 μ |
| same, but resin-coated according to the invention | 118 μ |

The above results were obtained by calculating the average of a two-time blasting against the surface to be cleaned.

(3) Results of Comparative Tests for the Particle-Size Distribution

FIG. 3 shows the distribution of particle sizes of No. 4 silica sand (JIS, conventional) and the same sand resin-coated according to the invention, as measured before and after such materials are blasted once, the particle size (in millimeters) being plotted as the abscissa, and the percentage as the ordinate.

According to this graph, it can be seen that the distribution of the particle sizes of the inventive, resin-coated sand before use, as indicated by curve I, is such that the particle-size range of 1.1 to 0.6 mm covers 93.2% (13+54+26.2%), demonstrating that the particles are very uniform in size, whereas in the case of the uncoated No. 4 silica sand, indicated by curve II, the same particle-size range covers only 75.4% (6+32.7+36.7%), showing that there is a relatively large variation in those particle sizes.

Further, when the distribution of the material after being used once is investigated as to particle sizes of not less than 0.3 mm, capable of being re-used, it is seen that in the case of the present inventive product, indicated by curve III, 68.9% are re-usable, whereas in the conventional material, curve IV, only 59.5% are re-usable.

It is also seen that the amount of dust (particles of not more than 0.2 mm) found after a single blasting is 30.1% with the inventive abrasive material, and 38.9% with the conventional product (again, curves III and IV, respectively).

FIG. 4 shows the distribution of particle sizes of slag (conventional article) and the same kind of slag resin-coated according to the present invention, as measured before and after each material is blasted once. The particle size (in mm) before the blasting is indicated by curve I' for the inventive product, and by curve II' for the conventional article, and the size after the blasting is indicated by curves III' and IV', respectively. The abscissa indicates the particle size, and the ordinate the percentage.

According to this graph, it is seen that the particle sizes of not less than 0.3 mm after a single blasting, which are capable of being re-used, cover 73.5% (3+9.5+22.6+21.3+17.1%) with the invention, and only 60.5% (2.1+6.1+15.8+18.1+18.4%) with the conventional article.

It is also seen that the amount of dust (again, the particles under 0.2 mm), found after a single blasting, is 26% with the present invention, whereas it is a rather high 38.9% with the conventional article.

From the comparative test results described above, it is seen that (item (1)) the abrasive materials resin-coated according to the invention provide a much lower rate of production or incidence of dust than with the conventional article. Particularly in the case of silica sand, the invention is capable of reducing the dust to a negligibly small proportion, as compared to the conventional value. This means that the invention prevents environmental pollution and greatly contributes to improving environmental working conditions.

As is clear from item (2), the abrasive materials resin-coated according to the invention provide an indentation depth which is not very different from or, rather, greater than that provided by the conventional articles, demonstrating that the invention improves the blast-cleaning effect.

Further, as is clear from item (3), the abrasive materials prepared according to the invention retain fewer cracks than the conventional products, so that a correspondingly greater proportion of used or blasted material can be recovered for re-use, e.g. by installing an abrasive material recovering device, thus substantially contributing to the reduction of costs. Further, the present inventive products are also superior to the conventional ones in respect of reducing the amount of dust.

It will be understood by those skilled in the art that departures from, changes in, and/or additions to both the inventive method and the products can be made in the usual manner without departing from the spirit and/or scope of this invention.

What I claim is:

1. A method of producing pulverized abrasive materials for sand blasting, comprising the steps of: carrying out a first phase by adding two parts of a thermosetting resin, to which one part of a setting catalyst has been added, to 100 parts of a pulverized material of grade No. 4, selected from the group that consists of silica sand and slag; uniformly mixing them while blowing heated air thereinto at about 80° to 100° C., constituting a first heat treatment, so as to coat the resulting pulverized sand-blasting abrasive material with the resin in a fixed thickness, to dry and to thermally set the resin coating on the abrasive material; and carrying out a second, separate phase by a subsequent re-heating treatment at about 300° C. while stirring up, so as to change chemically the resin coating, obtained on the abrasive material in the first heat treatment, and to render the coating unsoluble and unmeltable while leaving the abrasive material in the pulverized condition; the coating increasing the strength of the abrasive material by penetrating into cracks inherent in the abrasive material so that a substantial proportion of the pulverized abrasive material can be recovered after the sand blasting for re-use; whereby the heat, generated by impact when the abrasive material is blown against a surface, to be cleaned by the sand blasting, leaves the unsoluble and unmeltable coating in this state, and actually continues the setting of that coating so that sand-blasting efficiency is increased; and whereby dust formation during the sand blasting is reduced, thereby increasing environmental protection.

2. The method as defined in claim 1, wherein said step of rendering the resin coating unsoluble and unmeltable is performed in a rotary kiln by unidirectionally blowing hot air onto the coated abrasive material.

3. The method as defined in claim 1, wherein said step of rendering the resin coating unsoluble and unmeltable is performed by vibrating the coated abrasive material on a conveyor and irradiating the same with infrared rays.

* * * * *